United States Patent
Haug et al.

(10) Patent No.: US 10,250,294 B2
(45) Date of Patent: *Apr. 2, 2019

(54) DATA RECOVERY OF DATA SYMBOLS

(71) Applicant: Landis+Gyr Technologies, LLC, Pequot Lakes, MN (US)

(72) Inventors: Stuart Haug, Hackensack, MN (US); Damian Bonicatto, Pequot Lakes, MN (US)

(73) Assignee: Landis+Gyr Technologies, LLC, Pequot Lakes, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/384,038

(22) Filed: Dec. 19, 2016

(65) Prior Publication Data

US 2017/0163310 A1 Jun. 8, 2017

Related U.S. Application Data

(63) Continuation of application No. 14/959,002, filed on Dec. 4, 2015, now Pat. No. 9,525,462.

(51) Int. Cl.
*H04B 1/50* (2006.01)
*H04B 1/54* (2006.01)
(Continued)

(52) U.S. Cl.
CPC .............. *H04B 3/542* (2013.01); *H04B 1/50* (2013.01); *H04B 3/54* (2013.01); *H04B 15/005* (2013.01)

(58) Field of Classification Search
CPC ........ H04B 1/005; H04B 1/38; H04B 1/3827; H04B 1/40; H04B 1/50; H04B 3/00;
(Continued)

(56) References Cited

U.S. PATENT DOCUMENTS 4,692,761 A 9/1987 Robinton
6,359,938 B1 3/2002 Keevill et al.
(Continued)

FOREIGN PATENT DOCUMENTS

EP 2023520 A1 2/2009
EP 1592162 B1 2/2011
WO 2009031801 A2 12/2009

OTHER PUBLICATIONS

DSCPRelated.com "Confused about complex signal," Dec. 6, 2008 (retreived Oct. 22, 2014), www.dsprelated.com/showmessage/106186/1.php>.

(Continued)

Primary Examiner — Young T Tse
(74) Attorney, Agent, or Firm — Kilpatrick Townsend & Stockton LLP

(57) ABSTRACT

In one or more embodiments, a plurality of PLC endpoints and a data processing circuit are configured to share information, in the form of data blocks over power lines in a power line communication (PLC) network. A first signal representing a transmitted one of the data blocks is received over a first one of the plurality of different communication channels. A second signal representing the transmitted one of the data blocks is received over a second one of the plurality of different communication channels. Information carried by said one of the data blocks is discerned, as a function of a signal versus noise measure associated with the first signal and the second signal, by combining energy from the first and second signals, and converting the combined energy for generating output data.

14 Claims, 13 Drawing Sheets

(51) Int. Cl.
*H04B 15/00* (2006.01)
*H04B 3/54* (2006.01)

(58) Field of Classification Search
CPC .......... H04B 3/54; H04B 3/542; H04B 3/546;
H04B 3/60; H04B 5/0037; H04B 5/02;
H04B 15/005; H04B 15/02
USPC ....... 375/219, 220, 222, 224, 225, 257, 259;
370/310, 328, 343; 455/14, 500, 68, 69,
455/553.1
See application file for complete search history.

(56) References Cited

U.S. PATENT DOCUMENTS

| | | | |
|---|---|---|---|
| 6,442,145 B1 | 8/2002 | De Lange et al. | |
| 6,535,551 B1 | 3/2003 | Sweitzer et al. | |
| 6,546,046 B1 | 4/2003 | Sweitzer et al. | |
| 6,570,915 B1 | 5/2003 | Sweitzer et al. | |
| 6,643,469 B1 | 11/2003 | Gfeller et al. | |
| 6,687,315 B2 | 2/2004 | Keevill et al. | |
| 6,829,294 B2 | 12/2004 | Sweitzer et al. | |
| 7,196,644 B1 | 3/2007 | Anderson et al. | |
| 7,512,074 B2 | 3/2009 | Strutt et al. | |
| 7,616,706 B2 | 11/2009 | Koslov | |
| 7,729,373 B2 | 6/2010 | Dale et al. | |
| 7,765,453 B2 | 7/2010 | Duggan | |
| 7,773,581 B2 | 8/2010 | Punj et al. | |
| 7,975,109 B2 | 7/2011 | McWilliams et al. | |
| 8,018,379 B1 | 9/2011 | Sun et al. | |
| 8,300,657 B2 | 10/2012 | Dale et al. | |
| 8,315,341 B2 | 11/2012 | Razazian et al. | |
| 8,359,530 B2 | 1/2013 | Sawai et al. | |
| 8,391,405 B2 | 3/2013 | Kwon et al. | |
| 8,405,546 B1 | 3/2013 | Yeh et al. | |
| 8,410,979 B2 | 4/2013 | Sun et al. | |
| 8,484,370 B1 | 7/2013 | Coffee et al. | |
| 8,489,979 B2 | 7/2013 | Rub | |
| 8,762,820 B1 * | 6/2014 | Bonicatto | H04B 3/00 375/260 |
| 9,081,684 B2 | 7/2015 | Haug et al. | |
| 2003/0227373 A1 * | 12/2003 | Lou | H04B 3/542 370/397 |
| 2011/0043340 A1 | 2/2011 | Kim et al. | |
| 2012/0084559 A1 | 4/2012 | Bonicatto | |
| 2012/0106664 A1 | 5/2012 | Bonicatto et al. | |
| 2012/0121046 A1 | 5/2012 | Choi et al. | |
| 2012/0130656 A1 | 5/2012 | Bickel | |
| 2013/0034137 A1 | 2/2013 | Zuckerman | |
| 2013/0163683 A1 | 6/2013 | Morris et al. | |
| 2013/0181847 A1 | 7/2013 | Willig et al. | |
| 2013/0215933 A1 | 8/2013 | Young et al. | |
| 2014/0064387 A1 | 3/2014 | Bonicatto et al. | |
| 2014/0126720 A1 | 5/2014 | Bonicatto | |
| 2014/0247892 A1 | 9/2014 | Williams et al. | |
| 2015/0067431 A1 | 3/2015 | Haug et al. | |

OTHER PUBLICATIONS

International Search Report for PCT/US2014/052992, dated Nov. 28, 2014.

* cited by examiner

DATA RECOVERY OF DATA SYMBOLS

RELATED PATENT DOCUMENT

This patent document is a continuation under 35U.S.C. § 120 of U.S. patent application Ser. No. 14/959,002 filed on Dec. 4, 2015 (U.S. Pat. No. 9,525,462) and which is fully incorporated herein by reference.

BACKGROUND

Digital communication over noisy channels (e.g., over power lines and wireless mediums) poses a challenge to reliable, error-free data transfer between a transmitter and receiver. Portions of the transmitted data may be corrupted by noise, resulting in errors at a receiver. Some methods for communicating data symbols over noisy channels request retransmission of any data symbols received in error. These methods rely on the probability that the retransmission will occur during less-noisy channel conditions and the data will be received error-free. However, if the channel is still excessively noisy, there will likely be errors in the retransmitted symbols, and nothing would be gained by the retransmission.

SUMMARY

Aspects of the present disclosure are directed to network applications for communicating data in noisy environments and are applicable to a variety of applications, devices, systems, and methods. In one or more embodiments, information is shared between a plurality of endpoints and a data processing apparatus communicatively connected thereto. Some embodiments provide for communication in power line communication networks. For instance, in one or more embodiments, a system includes a plurality of endpoints (e.g., power meters and/or power substation processing units) configured to exchange information (e.g., power meter reports, programming information, control commands, and/or status data) with a data processing apparatus over a plurality of communication channels.

Some embodiments provide for communication in power line communication (PLC) networks. For instance, in one or more embodiments, a system includes a plurality of endpoints (e.g., power meters) configured to exchange information (e.g., provide data power meter reports and/or control signals) with a data processing apparatus (e.g., central command station) over a plurality of communication channels. The data processing apparatus is configured to interact with the plurality of endpoints and receive data (i.e., one or more bits) communicated by the endpoint over one or more power lines using the plurality of communication channels. A data block is communicated by transmitting the data block over multiple PLC channels. After signals representing the data block are received, via the PLC channels, the phases of the signals are aligned per a common reference point. The processing apparatus combines energy from the aligned signals and discerns data from the combined energy. The processing apparatus provides the discerned data in the form of a recovered data symbol.

As more generally applicable to some other applications, in some embodiments, a system includes one or more endpoints connected in a communication network. As used herein, an endpoint refers to a device having circuits configured to transmit and/or receive data blocks over one or more transmission mediums (e.g., copper wire, fiber optics, and/or wireless) included in the communication network. The system includes a data processing apparatus having a data-communication circuit communicatively coupled to the one or more endpoint devices and being configured and arranged to receive data values communicated by the endpoint devices via the plurality of communication channels. At least one data block is communicated by the data block over multiple ones of the plurality of communication channels. A first signal representing the transmitted data block is received over a first one of the plurality of different communication channels. A second signal representing the transmitted data block is received over a second one of the plurality of different communication channels. With phases of the signals aligned per a common reference point, energy of the data signals is combined and an output data is discerned from the combined energy.

These and other aspects of the present disclosure are exemplified in a number of implementations and applications, some of which are described in the accompanying drawings and the description below. Other features, aspects, and advantages of the subject matter will become apparent from the description, the drawings, and the claims.

BRIEF DESCRIPTION OF THE DRAWINGS

The invention may be more completely understood in consideration of the following detailed description of various embodiments of the invention in connection with the accompanying drawings, in which.

Figure 1:
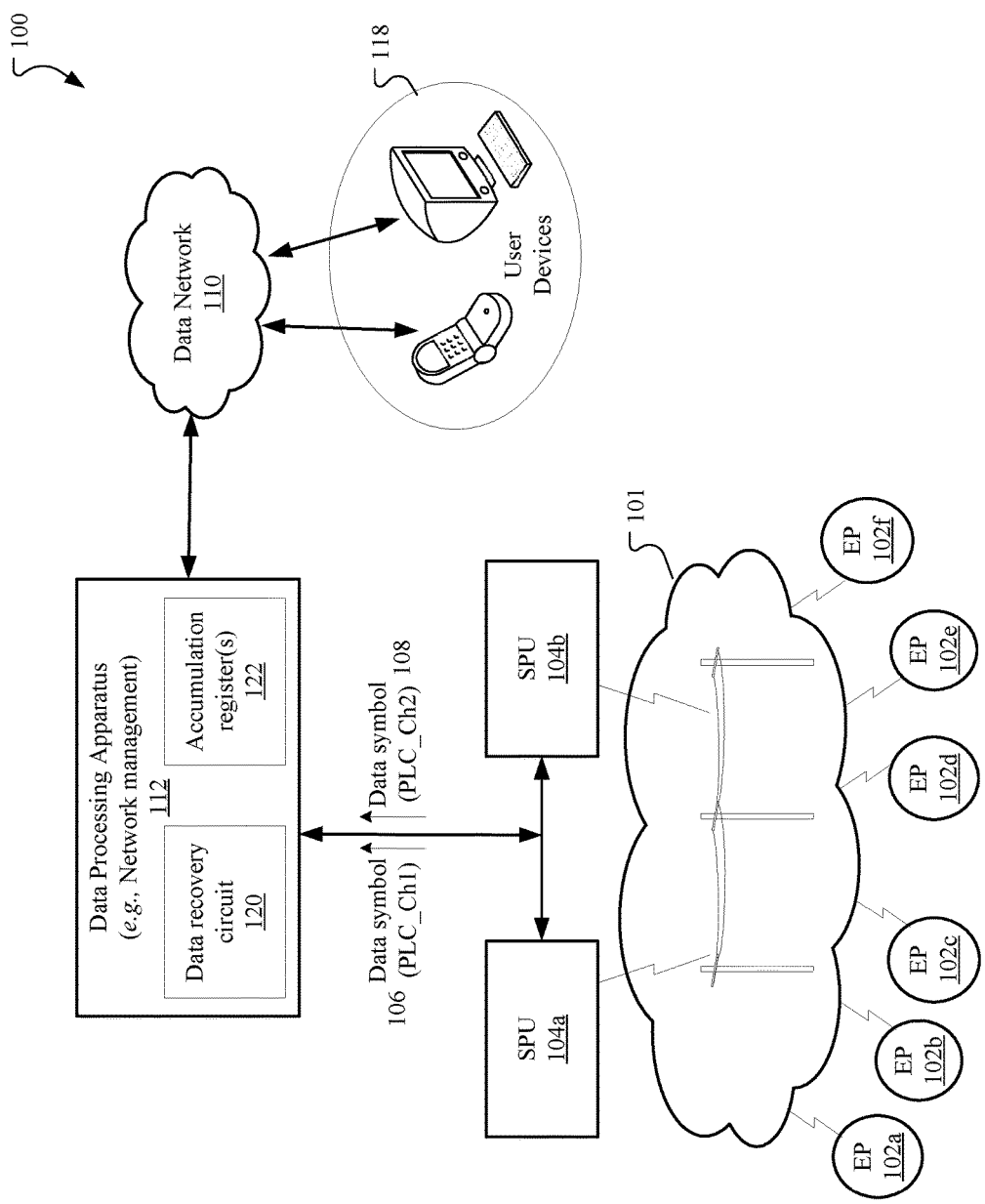
FIG. 1 is a block diagram of an example network environment in which endpoints transmit data.

While various embodiments are amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

One or more embodiments of the present disclosure provide systems and methods for recovery of data from a plurality of transmissions of the data that might be subjected to (communication/transmission) errors during the communication such as can often occur when transmitting data over power lines in power-line communication (PLC) networks. In such systems and communication environments, high-integrity data (preferably error-free) communication is important. According to certain implementations and applications presented in connection with the present disclosure, substantial benefit has been provided to such systems and communication environments and, without necessarily being limited thereto, the present disclosure uses PLC networks to exemplify systems and methods in which corresponding data transmissions (some of which might be in error) are aligned with a common reference point for combining energy from these corresponding data transmissions and in turn, discerning correct data values from the combined energy.

As exemplified in such PLC networks, in certain embodiments, a plurality of endpoint devices (e.g., power meters and/or relay stations) are configured to exchange information (e.g., power meter reports and/or control signals) in the form of data blocks (or simply groupings of data) with a remotely-situated data processing circuit over a plurality of communication channels on a power line. The remotely-situated data processing circuit is sometimes implemented in the form of a central command station as would often be managed by a power utility company which is configured and arranged to provide and distribute power to many (thousands) of houses, apartment buildings, offices and most other types of facilities. In this context, an endpoint device refers to a (circuit-based) device with circuitry designed to transmit and/or receive data via a set of power lines in the PLC network, where the power lines are coupled to the circuitry and used to provide power to various facilities associated with the PLC network. At each end of the data transmissions, is a data-receiving circuit and a data-transmission circuit; for example, one receiving/transmission circuit resides in the endpoint device and another resides in a collector or other device managed by the central command station. These data-communicating circuits are designed to send and receive signals which carry the data to represent the data blocks as sent over different communication channels defined by the PLC network and its communication scheme or protocol, and these are the types of communications that are subject to data-communication errors such as experienced by excessive noise being present in the communication channels. The consequence of not accounting for these errors is that the received signals, and the data block represented by these signals, are erroneous. According to certain aspects of the present disclosure, these signals are sent and received multiple times and should some of these signals be erroneous, the receiving device (or circuit) recovers the true signal/data by aligning the received signals using a common reference point (e.g., a beginning, intermediate and/or endpoint of the data block) and by combining the received energy from the aligned signals. The receiving device then discerns data from the combined energy before attempting to use the data in the form of an output data block.

In more specific embodiments, the signals representing the same information are sent as duplicates or copies of one another or as being sufficient corresponding in data content such that when they are received multiple times over the power lines, the true data content can be discerned even in the presence of certain degrees of noise carried with the individual signals. The skilled artisan would appreciate that such acceptable degrees of noise can be tested and defined relative to system parameters including, for example, an amount of expected noise and a tolerable/acceptable number of times the same or corresponding data content is sent over the power lines. In cases where the number of available channels is limited, these parameters also take into account the time of day such noise would be at high levels and how many available channels would be available at those times. Typically, the higher the expected levels/types of noise, the higher the number of times that the same or corresponding data content is sent over the power lines. While these parameters and tolerances can vary significantly, in certain system designs, for example, the tolerable noise factor is defined as 18 db of signal-to-noise and above, and a tolerable/acceptable number of times is in the range of 1-4. When these corresponding signals are received by the same receiving device multiple times (e.g., a first signal representing a transmitted one of the different data blocks over a first one of the plurality of different communication channels and a second signal also representing the transmitted one of the different data blocks over a second one of the plurality of different communication channels) information carried by these signals is discerned by aligning phases of the first and second signals, combining energy from the first and second signals as aligned, and converting the combined energy and therefrom providing output data representing said one of the different data blocks.

In some embodiments, transmission of a data block may include transmission of one or more data symbols or a portion thereof. For ease of explanation, examples may be primarily discussed with reference to transmission of an individual data symbol. At least one data symbol is communicated by transmitting the data symbol over multiple separate communication channels assigned for communication by one of the plurality of endpoints. Transmissions of the data symbol via the separate communication channels may be performed concurrently, overlapping, and/or sequentially in time.

Within each receiving device, a logic circuit such as circuit including and controlled by a programmed computer, is configured (designed as a processing apparatus) to receive a plurality of data symbols over respective ones of the communication channels. If excessive noise is present in the communication channels, the received data symbols may be in error. The processing apparatus combines energy from the aligned data symbols and discerns the true data from the communication signals that are received over the communication channels. The processing apparatus provides the discerned data in the form of an output data symbol.

As more generally applicable to some other applications, in some embodiments, one or more endpoint devices are configured to transmit data over various transmission mediums (e.g., copper wire, fiber optics, and/or wireless).

In some embodiments, the receiving device's data processor includes a communication circuit communicatively coupled to one or more endpoint devices. The communication circuit is configured to receive data symbols, corresponding to respective transmissions of the same data symbol, over the plurality of communication channels. The data communication circuitry aligns phases of the received data symbols per a common reference point. The data communication circuitry is configured to combine energy of the aligned data symbols and determine a third data symbol from the combined energy.

In some embodiments, additional data symbols may be retransmitted if a data symbol cannot be discerned from the combined energy of a first set of concurrently received data symbols. Energy of the retransmitted symbols and first set of data symbols may be combined and used to recover an error-free data symbol. In some implementations, retransmissions are performed individually for each symbol received in error. In some other implementations, a group of different data symbols (e.g., a data packet) may be retransmitted in response to any symbol in the group of data symbols being received in error. While embodiments are not so limited, for ease of reference, many of the examples are primarily discussed with reference to transmission and retransmission of an individual data symbol.

Different embodiments may utilize different schemes for retransmission of data symbols received in error. In some embodiments, each transmission/retransmission includes a single instance of the data symbol to be transmitted. In some embodiments, each transmission/retransmission again concurrently transmits multiple instances of a data symbol over respective separate communication channels. In some embodiments, the number of instances of the data symbol included in each transmission and/or retransmission may be adjusted based on the amount of noise in a particular environment. In some implementations, such an adjustment may be performed based on various indicators of channel conditions including but not limited to error rate and/or signal to noise ratio (SNR).

In some embodiments, the endpoint devices are configured to retransmit a data symbol if a transmission is not acknowledged by the data processor within a certain amount of time. In other embodiments, retransmission may be initiated by a retransmission request sent from the data processor. For instance, if the correct value cannot be determined from the combined data, the data processor requests retransmission of the data symbol or symbols received in error.

Energy is respectfully combined for transmission/retransmission(s) in error of data symbols representing the same data symbol. Each of the multiple data symbols used for transmission/retransmission is modulated with the same encoding scheme and is phase aligned with the other data symbols (to be combined) per a common reference point (e.g., beginning of symbols or end of symbols). This approach can be modified by changing the modulation by attempting to mitigate the signal's susceptibility to noise, so long as the transmission and retransmission of the data symbols are sent using the same modulation scheme.

Various embodiments may encode data symbols using various different modulation schemes which may modulate, e.g., frequency, amplitude, and/or phase of a signal to encode a data value. In connection with experimental/specific embodiments discovered in connection with the present disclosure, frequency-shift key (FSK) modulation schemes and the following phase-shift-key modulation schemes have been found to be particularly beneficial and complementary: BPSK (binary phase SK), QPSK (quadrature phase SK), APSK (amplitude phase SK), DBPSK (differential binary phase SK), DQPSK (differential quadrature phase SK), DAPSK (differential amplitude phase SK). For example, certain modulation schemes encode multiple data values in respective phases of a data symbol as is the case for quadrature amplitude modulation (QAM). QAM modulates an in-phase signal (I) with a first data value, and a quadrature phase signal (Q) (e.g., rotated by 90 degrees from the in-phase signal) with a second data value. For data symbols that include multiple phase components (e.g., I and Q components), energy is combined from data symbols received in error by combining the energy of each phase component separately. For instance, in an implementation utilizing QAM to encode data symbols, the data processor is configured to combine the energy of two data symbols in error by accumulating energy of the I signal components to produce a combined I value and accumulating energy of the Q signal components to produce a combined Q value. A correct I component value of the data symbol to be recovered is discerned from the combined I value. Similarly, a correct Q component value of the data symbol to be recovered is discerned from the combined Q value.

Turning now to the figures, FIG. 1 shows a block diagram of an example network environment 100 in which endpoints 102 transmit data in accordance with one or more embodiments of the present disclosure. The network environment 100 includes a service network 101 in which a plurality of endpoints 102a-102f are coupled (e.g., communicatively coupled) to substation processing units (SPUs) 104a, 104b. The SPUs provide communications received from the endpoints 102a-102f to a data processor (or data processing apparatus) 112 (e.g., a network management apparatus). The data processor is configured to process communications that are received from SPUs 104a, 104b and/or control aspects of the service network which is based, at least in part, on the communications provided by the SPUs 104a, 104b. The data processor 112 is configured to recover data from a plurality of concurrent transmissions and/or retransmissions (of the same data symbols) that are received in error. Phases of the corresponding data transmissions in error are aligned by the data processing apparatus per a common reference point and energy is combined therefrom. Correct data values are then discerned from the combined energy. In this example, the data processor 112 includes a data recovery circuit 120 configured to store combined values (e.g., combined I values and combined Q values) of data symbols received in error in accumulation register(s) 122. The data recovery circuit is further configured to discern correct data value(s) of data symbols received in error using the combined values in the accumulation register(s) 122.

The endpoints 102 can be any device capable of transmitting data in the network environment 100. For example, the endpoints 102 can be, e.g., meters in a utility network (e.g., electricity meters, gas meters, or water meters), computing devices, (television) set top terminals, or telephones that transmit data in the service network 101. The endpoints 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. The endpoints 102 report the operating characteristics of the service network 101 over communication channels. Communication channels may be respective portions of the spectrum over which data are transmitted. The center frequency and bandwidth of each communication channel can depend on the communication system in which they are implemented. In some implementations, the communication channels for utility meters (e.g., power, gas and/or water meters) can be implemented in power line communication networks that dynamically allocate available bandwidth according to an orthogonal frequency division multiple access (OFDMA) spectrum allocation technique or another channel allocation technique (e.g., Time Division Multiple Access, Code Division Multiple Access, and other Frequency Division Multiple Access techniques). As explained in more detail with reference to FIGS. 6 and 7, in some implementations, multiple communication channels may be distinguished from each other spatially using multipath propagation techniques, e.g., multiple input multiple output (MIMO).

In some embodiments, the endpoints 102 are power meters in a power distribution network and transmit reporting data to the data processor 112. The reporting data may include, e.g., measures of total power consumption, power consumption over a specified period of time, peak power consumption, instantaneous voltage, peak voltage, minimum voltage and other measures related to power consumption and power management (e.g., load information). In some implementations, each of the power meters can also transmit status data that specify a status of the power meter (e.g., operating in a normal operating mode, emergency power mode, or another state such as a recovery state following a power outage).

In some implementations, data symbols (i.e., one or more bits) including the reporting and/or the status data are continuously or intermittently transmitted over a specified symbol period. A symbol period is a period of time over which a particular symbol is transmitted. A symbol period for each symbol transmitted by a power meter can be less than or equal to the time interval (i.e., 1/update rate) at which updated meter information is required to be provided. For example, in one implementation, a particular meter is required to provide updated meter information every 20 minutes (i.e., the specified update rate for the meter). In this example, a meter can transmit a data value representing at least a portion of a first set of updated meter information for twenty minutes, and then transmit another data value representing a next set of updated meter information for a subsequent twenty minutes. The update rate for a meter can be specified by a network administrator based, for example, on types and amounts of updated meter information that are being received from the meter, preferences of a customer (e.g., a power company) to whom the data is being provided, and/or channel characteristics of the channel over which the data is being transmitted. An update rate of 20 minutes is used for purposes of example, but other update rates (e.g., 1 minute, 5 minutes, 10 minutes, 1 hour, or 1 day) can be used.

In FIG. 1, endpoints 102a-102c and 102d-102f are each configured to communicate data to substation processing units 104a, 104b, respectively. A data value may be communicated by concurrently transmitting multiple instances (106 and 108) of a data symbol representing the data value over separate communication channels. A substation processing unit (SPU, and sometimes referred to as a collector) is a circuit-based device/data processing apparatus that typically includes logic circuitry such as a computer, with the apparatus being designed and programmed to receive communications from endpoints to manage the service network 101 or for transmission to a data processing apparatus 112 and/or through a data network 110. For example, an SPU (e.g., block 104a of FIG. 1) can include a receiving circuit (aka receiver) that receives and processes symbols from endpoints (e.g., 102a-102c) and logs data from the symbols. An SPU can also take action based on the data received from the endpoints and transmit the symbols to a data processing apparatus 112 that manages the service network 101. SPUs 104a, 104b can transmit the individual symbols or generate a consolidated packet 108 that includes data from multiple symbols received from the endpoints 102a-102f.

In some implementations, a single SPU (e.g., 104a) can be configured to receive symbols from thousands of endpoints and transmit the symbols to a data processing apparatus 112. The data processing apparatus 112 is a data processing apparatus that processes communications that are received from SPUs 104a, 104b and/or controls aspects of the service network based, at least in part, on information extracted from the symbols that were received from the SPUs 104a, 104b.

In some embodiments, the data processing apparatus 112 in a PLC network can receive data indicating that power usage is significantly higher in a particular portion of a power network than in other portions of the power network. Based on this data, the data processing apparatus 112 can allocate additional resources to that particular portion of the network (i.e., load balance) or provide data specifying that there is increased power usage in the particular portion of the power network.

In some implementations, the data processing apparatus 112 provides data to user devices 118 that can be accessed, e.g., by the network operator, maintenance personnel and/or customers. For example, data identifying increased power usage can be provided to a user device 118 accessible by the network operator, who can, in turn, determine an appropriate action regarding the increased usage. Additionally, data identifying a time-of-use measure and/or a peak demand measure can also be provided to the user device 118. Similarly, if there has been a power outage, the data processing apparatus 112 can provide data to user devices 118 that are accessible by customers to provide information regarding the existence of the outage and potentially provide information estimating the duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two SPUs 104a, 104b and one data processing apparatus 112 are shown, the service network 101 can include many different SPUs that can each communicate with thousands of endpoints and many different data processing apparatus that can each communicate with multiple SPUs.

Symbols from a particular endpoint (e.g., 102a) may be transmitted over any of thousands of communication channels in a PLC system. For example, each endpoint can be assigned a particular set of channels using OFDM or another channel allocation technique. When endpoints 102a-102f are installed in the service network 101, the endpoints 102a-102f can each be assigned a symbol period. The symbol period that is assigned to a particular endpoint can be selected, for example, based on signal characteristics (e.g., signal amplitude) of communication signals that represent the symbols and are received at an SPU, relative to the amplitude of the noise floor that is present on the channel over which the communication signals are being received.

Each endpoint can be independently assigned a symbol period, such that different endpoints may transmit symbols over different symbol periods. For example, endpoint 102a may transmit each symbol over a 5 minute unit interval, while endpoint 102b may transmit each symbol over a 20 minute unit interval. Once an endpoint is assigned a symbol period, the symbol period can be stored in a memory circuit (not shown in FIG. 1) and indexed to (i.e., associated with) the endpoint and/or the channel over which the symbols from the endpoint are received. The data processing apparatus 112 and/or the SPUs 104a, 104b can access the memory circuit to identify the symbol period that has been assigned to the endpoint.

Figure 2A:
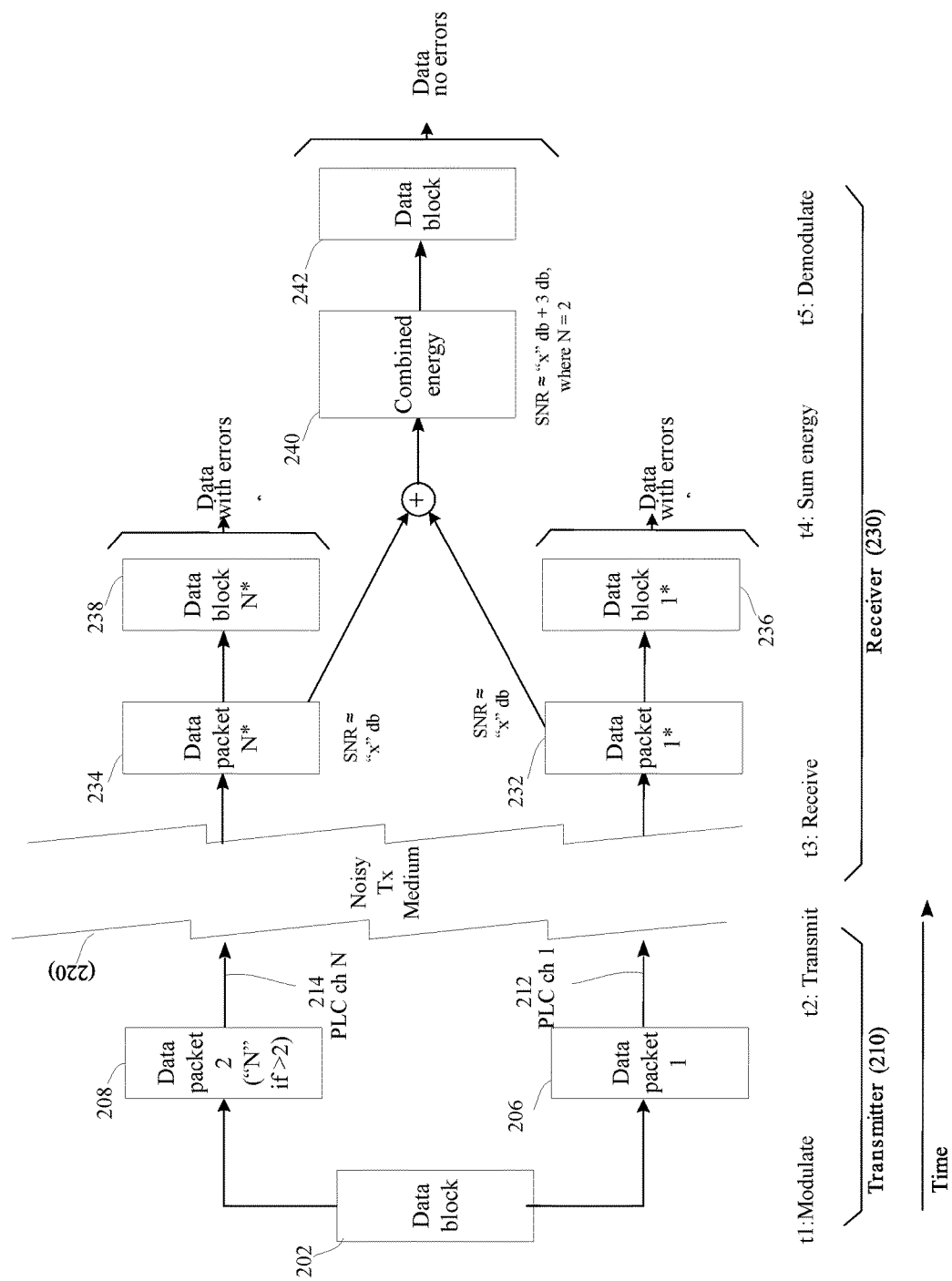
FIG. 2A shows an example transmission and accumulation of data symbols to improve the signal to noise ratio.

FIG. 2A shows an example transmission of data symbols and combining energy therefrom to improve the signal to noise ratio. A data block 202 is transmitted from a transmitter 210 to a receiver 230 over two or more different communication channels 212 and 214 over a noisy transmission medium 220. In this example, the data block 202, including 4 data symbols (S1, S2, S3, and S4), is modulated by the transmitter 210 to form data packet 206 for transmission on a first data channel 212. The receiver may use one of many possible modulation techniques, such as QPSK. The data block 202 is modulated with the same modulation scheme to form a second data packet 208 for transmission on a first data channel 214, including the same data as the first data packet 206. The data packets 206 and 208 are concurrently transmitted at time T1 over separate communication channels 212 and 214.

At the receiver 230, received data packet 232 is demodulated (e.g., one symbol at a time) to determine the transmitted data symbols 236. The received data packet 234 is similarly demodulated and into data symbols 238 are checked for errors. In this example, the receiver 230 detects error(s) in the data symbols 236 and 238. The receiver 230 combines the energy of the received data packets 232 and 238 to produce combined energy values 240. The combined energy values 240 are demodulated to produce data symbols 242.

Because energy is combined from multiple data symbols corresponding to the same data value and the same modulation, data signals should be cumulative in the combined values. Conversely, because random noise in the separate communication channels may differ, noise components in the signals may cancel each other out. Due to this behavior, the combined values 240 should exhibit a signal-to-noise ratio (SNR) that is better than that of either of the received data packets 232 and 234. As an example, for additive white Gaussian noise (AWGN), one implementation was calculated to provide an SNR improvement of roughly 3 db (assuming the same SNR on each received signal) over either of the individual data packets alone (e.g., (3+x) db).

If data symbols 242 of the combined values 240 are error-free, the data symbols 242 are output and the combined values 240 are discarded. Otherwise, the combined values 240 are saved and the data packet may be retransmitted. If any of the retransmitted data symbols 238 are error-free, the previous combined energy values may be discarded and the error free data symbols are output. Otherwise, energy of the retransmitted data symbols is combined with energy from the first transmission of the data symbols, which further improves the SNR. This process repeats in this manner until the data symbols 242 demodulated from the combined values 240 are error-free.

Figure 2B:
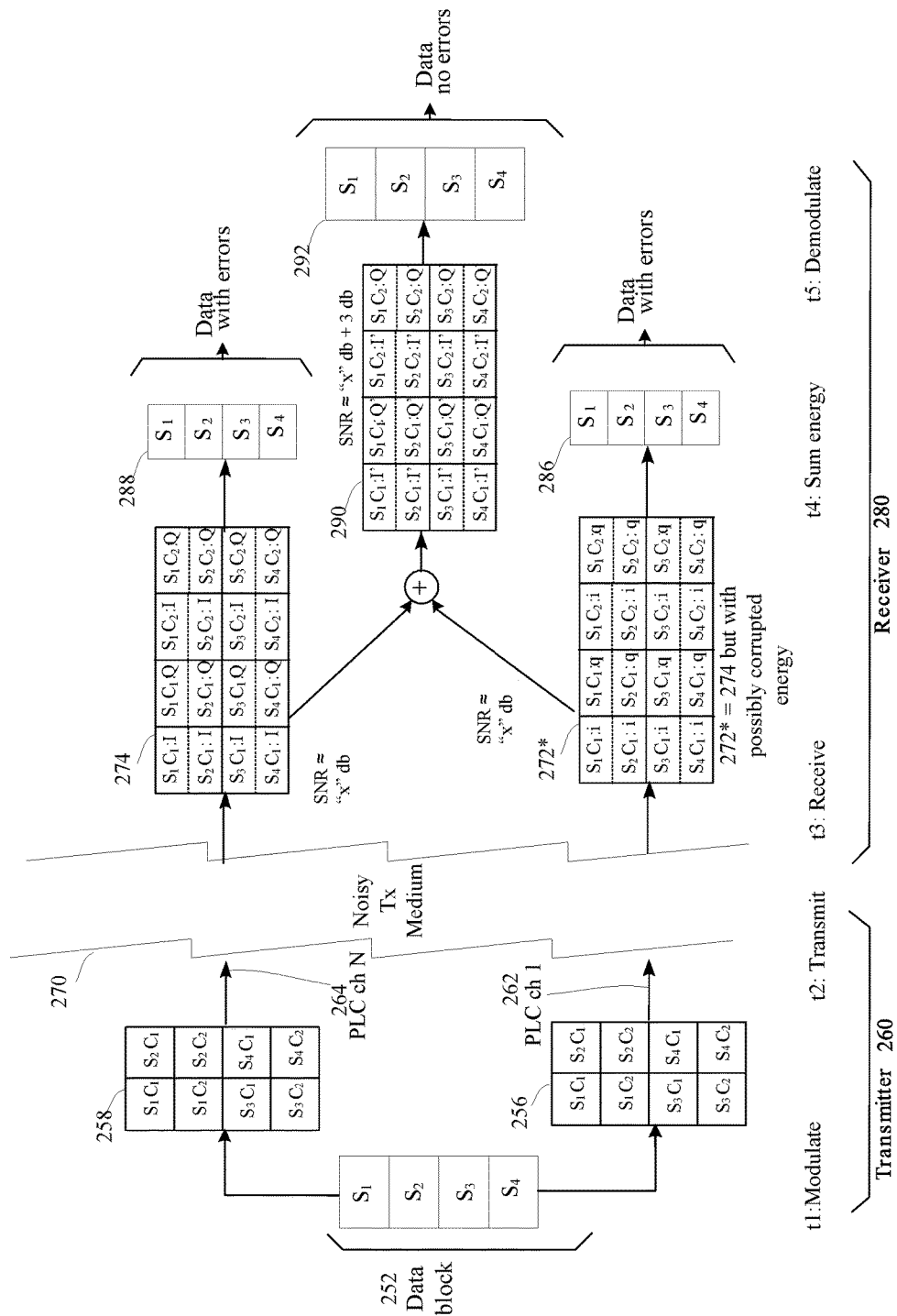
FIG. 2B shows an example transmission and accumulation of data symbols to improve the signal to noise ratio.

FIG. 2B shows an example transmission of data symbols and combining energy therefrom to improve the signal to noise ratio. A data block 252 is transmitted from a transmitter 260 to a receiver 280 over two or more different communication channels 262 and 264 over a noisy transmission medium 270.

In this example, the data block 252, including 4 data symbols (S1, S2, S3, and S4), is modulated by the transmitter 260 to form data packet 256 for transmission. In this example, each of the modulated data symbols consists of two subcarriers, $C_1$ and $C_2$. Each of the subcarriers is modulated with data using one of many possible modulation techniques, such as QPSK. The data block 252 is modulated with the same modulation scheme to form a second data packet 258, including the same data as the first data packet 256. Unlike other exemplary embodiments discussed herein where data packets are not concurrently transmitted, the data packets 256 and 258 are concurrently transmitted at time T1 over separate communication channels.

At the receiver 280, each sub-carrier of received data packet 272 is separated into I and Q signal components, which are demodulated to determine the transmitted data symbols 286. The received data packet 274 is similarly demodulated and data symbols 288 are checked for errors. In this example, the receiver 280 detects error(s) in the data symbols 286 and 288.

The receiver 280 combines the energy of I and Q components for each subcarrier of the data packets. For instance, I components (S1C1:I) corresponding to the first subcarrier (C1) of the first symbol (S1) are summed to form a respective combined value (S1C1:I'). As another example, Q components (S2C2:Q) corresponding to the second subcarrier (C2) of the second symbol (S2) are summed to form a respective combined value (S2C2:Q'). The combined values 290 are demodulated to produce data symbols 292.

Because energy is combined from multiple data symbols corresponding to the same data value and the same modulation, data signals should be cumulative in the combined values. Conversely, because random noise in the separate communication channels may differ, noise components in the signals may cancel each other out. Due to this behavior, the combined values 290 should exhibit a signal-to-noise ratio (SNR) that is better than that of either of the received data packets 272 and 274. As an example, for additive white Gaussian noise (AWGN), one implementation was calculated to provide an SNR improvement of roughly 3 db over either of the individual data packets alone (e.g., (3+x) db).

If data symbols 292 of the combined values 290 are error-free, the data symbols 292 are output and the combined values 290 are discarded. Otherwise, the combined values 290 are saved and the data packet may be retransmitted. If any of the retransmitted data symbols 288 are error-free, the previous combined energy values may be discarded and the error free data symbols are output. Otherwise, energy of the retransmitted data symbols is combined with energy from the first transmission of the data symbols, which further improves the SNR. This process repeats in this manner until the data symbols 292 demodulated from the combined values 290 are error-free.

Figure 3:
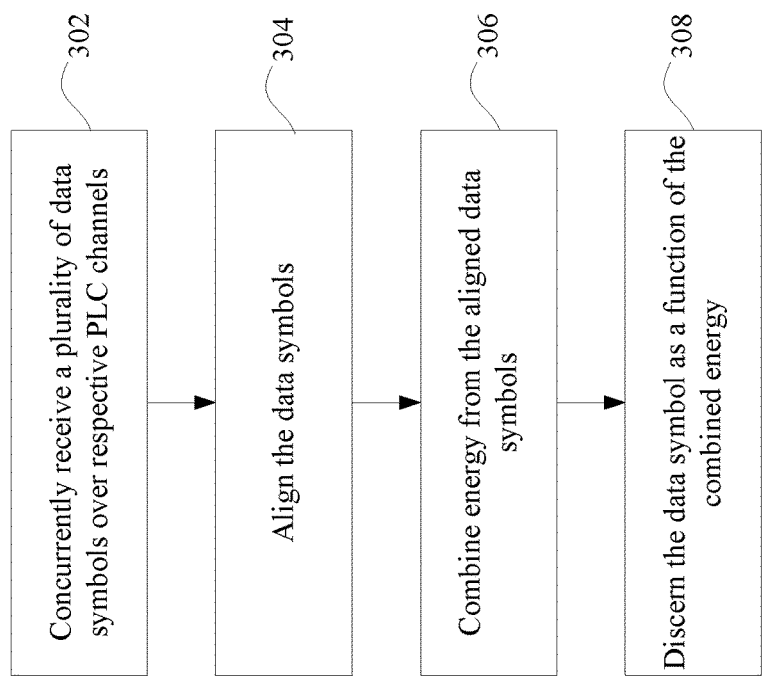
FIG. 3 shows a process for processing received data symbols in accordance with one or more embodiments.

FIG. 3 shows a process for processing received data symbols in accordance with one or more embodiments. At block 302, a set of data symbols are concurrently received (e.g., by a receiver and/or signal processing circuit) over respective ones of a plurality of communication channels. At block 304, the data symbols are aligned per a common reference point. At block 306, energy is combined from the set of data symbols. As indicated above, some embodiments use a modulation scheme (e.g., QAM) to encode multiple data values in each symbol using different phase components (e.g., I and Q components) of a carrier signal. In such embodiments, energy of I and Q components may be separately combined at block 306 (e.g., as described with reference to FIGS. 2A and 2B). At block 308, data symbols are recovered as a function of the combined energy.

Figure 4:
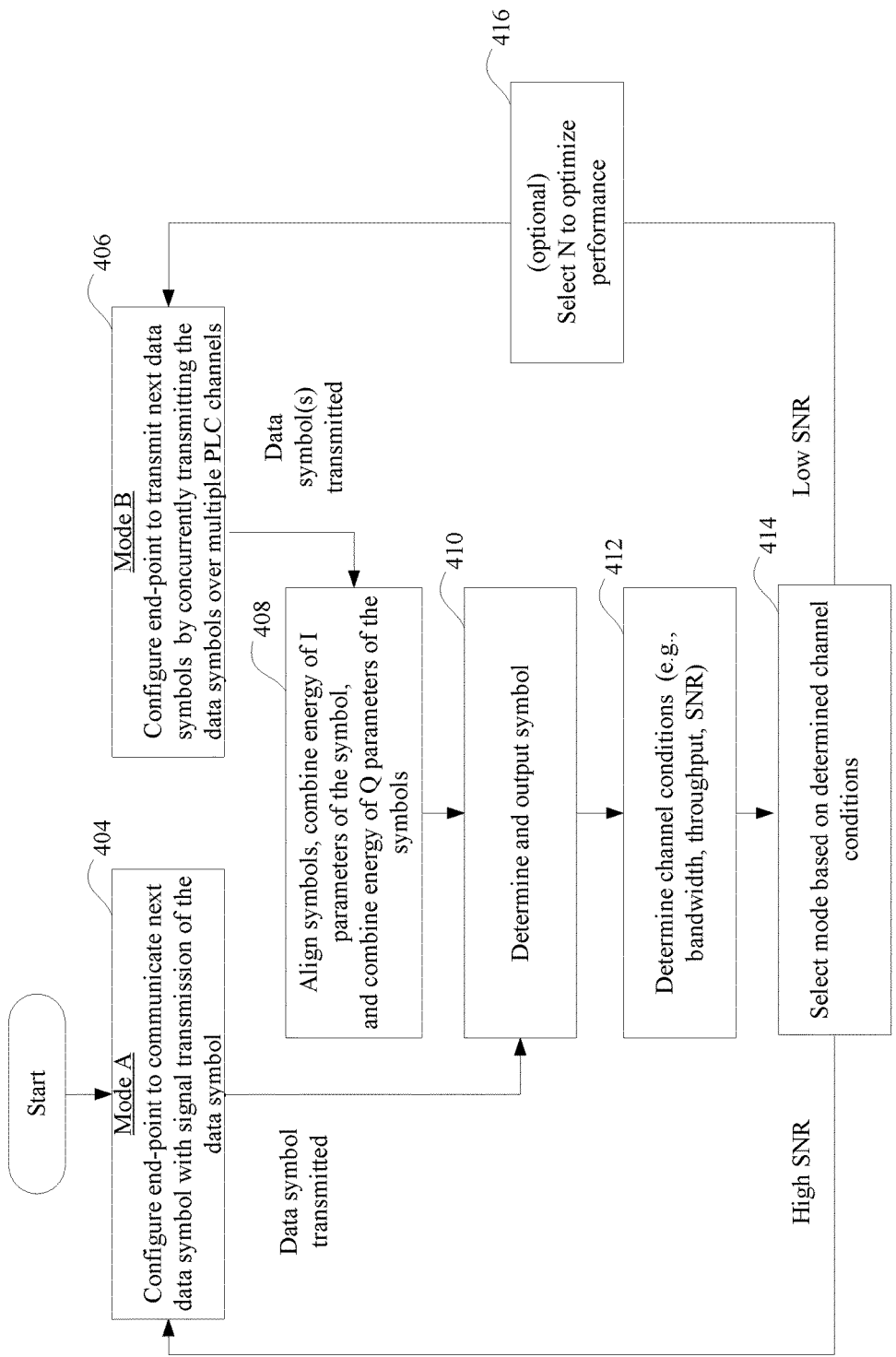
FIG. 4 shows a process for selection and adjustment of transmission by an endpoint based on conditions of communication channels used for transmission.

In some embodiments, the scheme used for transmission of a data value by an end-point may be changed and/or adjusted based on channel conditions (e.g., error rate and SNR). FIG. 4 shows a process for selection and adjustment of transmission by an endpoint based on conditions of communication channels used for transmission. In this example, retransmission is performed according to one or two schemes in mode A and mode B. While operating in mode A, each data symbol is communicated by a single transmission of the data symbol. While operating in mode B, a data symbol is communicated by transmitting the data symbol over multiple communication channels as described with reference to FIGS. 1-3. An end-point device is initially configured to operate in mode A at block 404. When operating in mode A, a received data symbol is determined and output at block 410. When operating in mode B, the energy of I and Q parameters multiple data symbols are respectively combined at block 408 as described with reference to FIG. 2B. At block 410, symbols are determined based on the combined I and Q values and output.

At block 412, channel conditions are determined. At block 414, retransmission mode is selected based on the determined channel conditions. In this example, if the channel exhibits a high signal to noise ratio, the process is directed to block 404 where the end-point is configured to operate using transmission mode A (if in mode B). This reduces the traffic on the transmission medium when probability of transmission error is low. Conversely, if the channel exhibits a low signal to noise ratio, the process is directed to block 406. At block 406, the endpoint is configured to operate in transmission mode B (if in mode A). This reduces the probability that retransmission will be required by concurrently transmitting multiple instances of the data symbol. Optionally, at block 416, the number (N) of instances of a data symbol that are transmitted at the same time may be adjusted. In one implementation, a larger N is used if channel conditions become worse and a lower N is used if channel conditions improve.

In very noisy environments, it may not be possible to discern correct data symbols from the combined energy of a set of data symbols. In some embodiments, a receiver may prompt an end-point to retransmit the set of symbols and combine energy from a retransmitted data symbol with the combined energy from the original set of data symbols.

Figure 5:
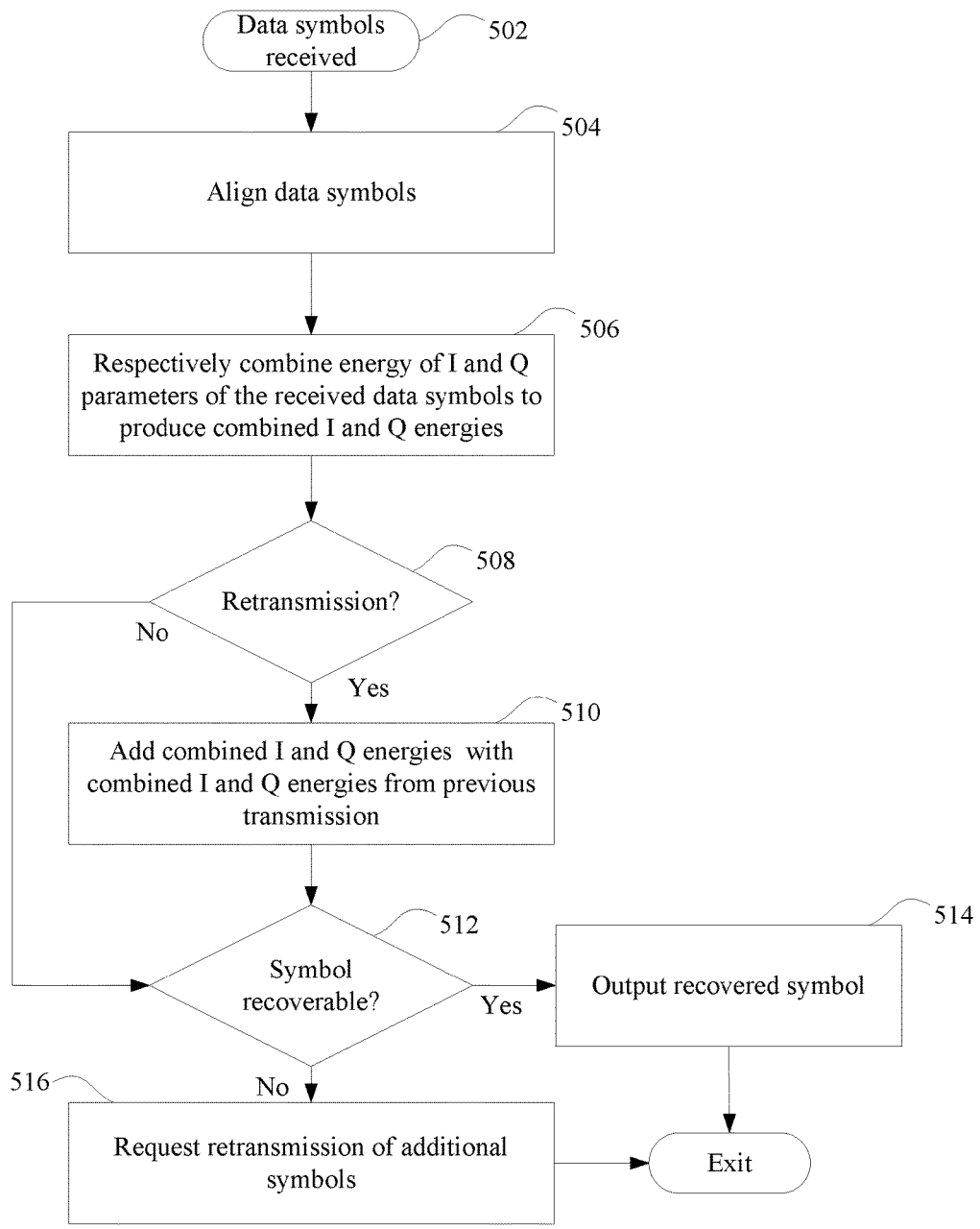
FIG. 5 shows a first process for retransmission and recovery of data symbols in accordance with one or more embodiments.

FIG. 5 shows a first process for retransmission and recovery of data symbols having I and Q components, in accordance with one or more embodiments. A set of data symbols is received at block 502 and are aligned at block 504. At block 506, energies of I and Q components of the data symbols are respectively combined to produce a combined I energy and a combined Q energy. If the symbols are a retransmission of a previous transmission, decision block 508 directs the process to block 510. Otherwise, block 510 is bypassed. At block 510, the combined I and Q energies are respectively added to the combined I and Q energies from the previous transmission. If a data symbol is recoverable from the combined energies, decision block 512 directs the process to output the recovered data symbol at block 514. Otherwise, decision block 512 directs the process to request retransmission of the data symbols at block 516.

A set of data symbols may be transmitted over various communication channels, which use different frequencies, transmission times, and/or transmission paths. In some implementations, communication channels may simultaneously transmit signals on the same frequency over a shared transmission medium. As previously described, signals for each channel may be spatially distinguished from each other using multipath propagation techniques (e.g., MIMO or multiple-input and multiple-output).

Figure 6:
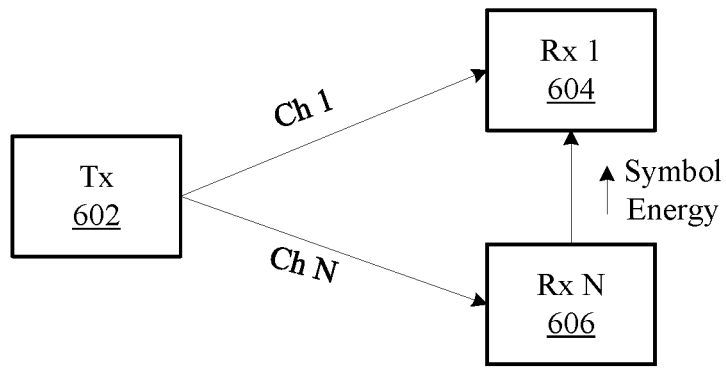
FIG. 6 shows an example communication system for concurrent transmission of data symbols over spatially discernible channels.

FIG. 6 shows an example communication system for concurrent transmission of data symbols over spatially discernible channels. In this example, a transmitter 602 is configured to transmit the same data symbol to N receivers 604 and 606 that are spatially separated from each other. The received symbols or measured energy is communicated to one of the receivers (e.g., 604) where it is combined, as previously described to facilitate recovery from errors. Alternatively, the data symbols or measured energy may be communicated from all of the N receivers 604 and 606 to a central processing circuit (not shown in FIG. 6) and communicatively coupled to the N receivers 604 and 606. For example, referring back to FIG. 1 data symbols may be communicated from an endpoint 102a to multiple SPUs 104a and 104b. Data symbols received by SPUs 104a and 104b may then be forwarded to a single data processing apparatus 112, where energy is combined, as previously described.

The symbols received by the receivers 604 and 606 (or energy measurements thereof) are communicated to a select one of the receivers (e.g., 604) where they are combined, as previously described, to facilitate recovery from errors. Alternatively, the data symbols or measured energy may be communicated from all of the N receivers 604 and 606 to a central processing circuit (not shown in FIG. 6) and communicatively coupled to the N receivers 604 and 606. For example, referring back to FIG. 1 data symbols may be communicated from an endpoint 102a to multiple SPUs 104a and 104b. Data symbols received by SPUs 104a and 104b may then be forwarded to a single data processing apparatus 112, where energy is combined, as previously described.

Figure 7:
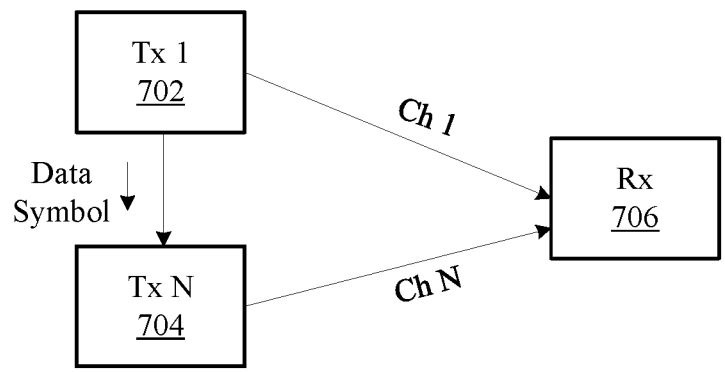
FIG. 7 shows an example communication system for concurrent transmission of data symbols over spatially discernible channels.

FIG. 7 shows an example communication system for concurrent transmission of data symbols over spatially discernible channels. In this example, the system includes N transmitters 702 and 704 that are spatially separated from each other and are configured to transmit the same data symbol to a single receiver 706. The receiver 706 is configured to distinguish and separate the data symbols received from each transmitter 702 and 704 using multipath propagation techniques (e.g., MIMO). The receiver 706 aligns the separated data symbols and combines energy from the aligned data symbols as previously described.

A set of data symbols may be transmitted over various communication channels, which use different frequencies, different (e.g., nonconcurrent and/or nonsimultaneous) transmission times, different transmission paths, different transmission technologies (e.g., RF, and/or optical and/or PLC) and/or any combinations thereof. In some implementations, communication channels may simultaneously transmit signals on the same frequency over a shared transmission medium. As previously described, signals for each channel may be spatially distinguished from each other using multipath propagation techniques (e.g., MIMO).

Figure 8A:
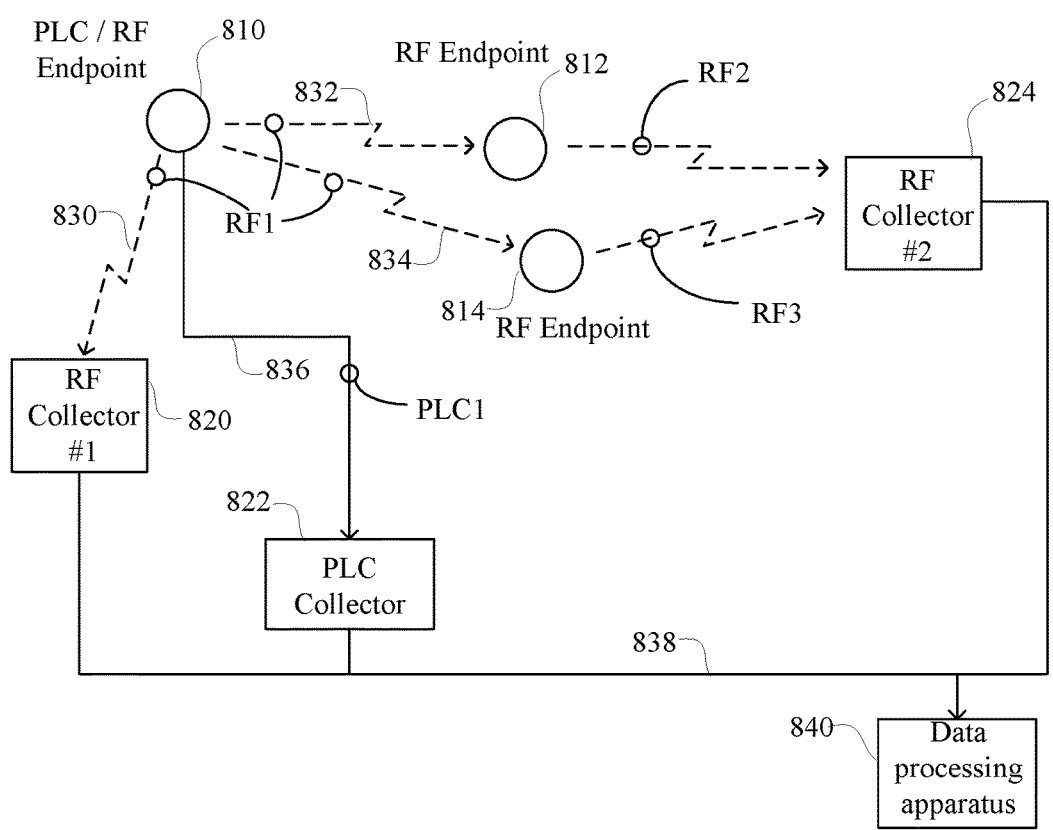
FIG. 8A shows an example communication system having an endpoint configured for concurrent transmission of a data block over multiple types of communication channels, in accordance with one or more embodiments.

FIG. 8A shows an example communication system having an endpoint configured for concurrent transmission of a data block over multiple types of communication channels, in accordance with one or more embodiments.

In this example, endpoint 810 is configured to communicate a data packet (PLC 1) encoding a data block to a PLC collector circuit 822 over a PLC communication channel

836. The endpoint 810 is also configured to communicate a data packet (RF1) encoding the data block over three radio frequency (RF) communication channels 830, 832, and 834. In this example, the communication channels 830, 832, and 834 are spatially separated as described with reference to FIG. 6. An RF collector circuit 820 is configured to receive the data packet RF1 over the communication channel 830. RF endpoints 812 and 814 are configured to receive the data packet RF1 over respective communication channels 832 and 834. In this example, RF endpoint 812 is configured to communicate data in the data packet RF1 to RF collector 824 as data packet RF2 over a different RF communication channel. RF endpoint 812 is configured to encode data in the data packet RF1 to form a data packet RF2 for communication to RF collector 824 over a different RF communication channel. Similarly RF endpoint 814 is configured to encode data in the data packet RF1 to form a data packet RF3 for communication to RF collector 824 over a different RF communication channel.

The communication channels may utilize different symbol periods, carrier frequencies, transmission mediums, and/or signal paths for communicating the data packets PLC1, RF1, RF2, and RF3. TABLE 1 shows example symbol period and carrier frequencies that may be used to transmit each of the data packets PLC1, RF1, RF2, and RF3 to the respective collector circuits 820, 822, and 824.

TABLE 1

| Symbol Properties | Symbol Period | C1 Subcarrier Frequency | C2 Subcarrier Frequency |
|---|---|---|---|
| PLC | 10 s | 1000.0 Hz | 1000.1 Hz |
| RF1 | 1 ms | 433.000 MHz | 433.001 MHz |
| RF2 | 1 ms | 433.100 MHz | 433.101 MHz |
| RF3 | 1 ms | 433.200 MHz | 433.201 MHz |

In this example, the collector circuits 820, 822, and 824 are configured to communicate data indicative of the received data packets PLC1, RF1, RF2, and RF3 to a data processing apparatus 840. In this example, the data processing apparatus is communicatively connected to the collector circuits 820, 822, and 824 via a backhaul data network connection 838 (e.g., Ethernet). In some implementations, the data processing apparatus 840 may be incorporated in one of the collector circuits 820, 822, or 824. The data processing apparatus 840 is configured to combine energy from the packets PLC1, RF1, RF2, and RF3 and discern data therefrom as described with reference to FIG. 1-7.

Figure 8B:
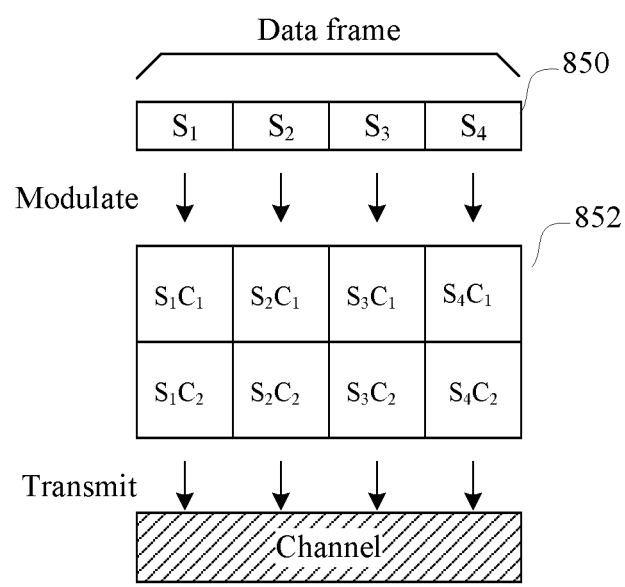
FIG. 8B shows an example modulation of a data block to produce a data packet for transmission over a communication channel, in accordance with one or more embodiments.

FIG. 8B shows an example modulation of a data block to produce a data packet for transmission by an endpoint over a communication channel, in accordance with one or more embodiments. The modulation is respectively performed for each data packet RF1 and PLC1 transmitted by endpoint 810. Similar modulation is performed by endpoints 812 and 814 which operate as repeaters by re-modulating the received data packet to form data packets RF2 and RF3. In this example, a data block 850 to be modulated includes 4 data symbols (S1, S2, S3, and S4). The symbols of the data block 850 are modulated to form data packet 852 for transmission. Each of the modulated data symbols in the data packet 852 in this example consists of two subcarriers, $C_1$ and $C_2$. The data packet is transmitted to a collector circuit, e.g., 820, 822, or 824 in FIG. 8A.

Figure 8C:
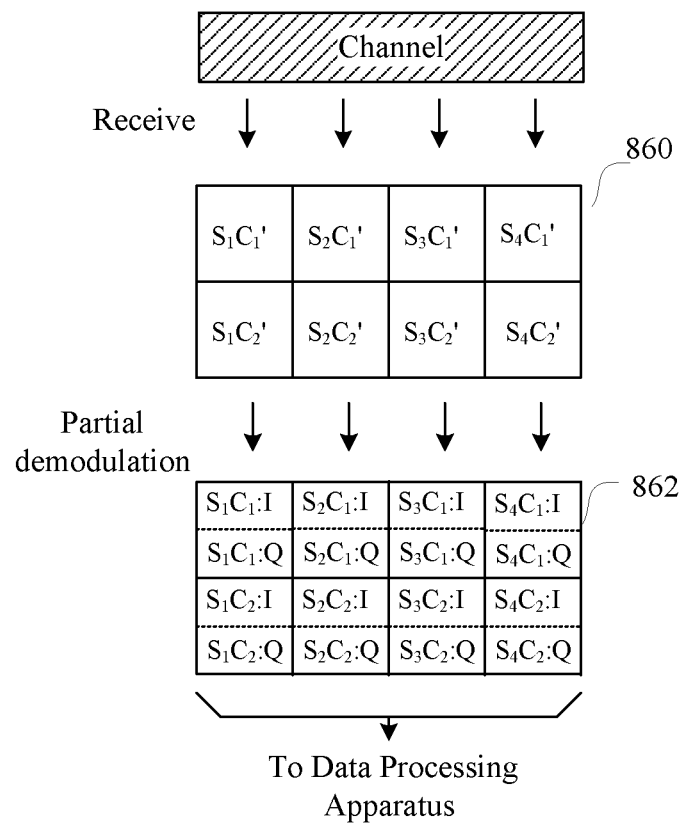
FIG. 8C illustrates an example partial demodulation of a received data block by a collector circuit, in accordance with one or more embodiments.

FIG. 8C illustrates an example partial demodulation of a received data block by a collector circuit, in accordance with one or more embodiments. In this example, a received data packet 860 is partially demodulated into I and Q components for each subcarrier of each symbol. For example, a first carrier of a first symbol ($S_1C_1$) is demodulated into components $S_1C_1$:Q and $S_1C_1$:I. The partially demodulated data packet 862 is transmitted to the data processing circuit 840, e.g., by collector circuit 820 via backhaul data network 838. Similar partial demodulation is performed for data packets received by other collector circuits 822 and 824.

Figure 8D:
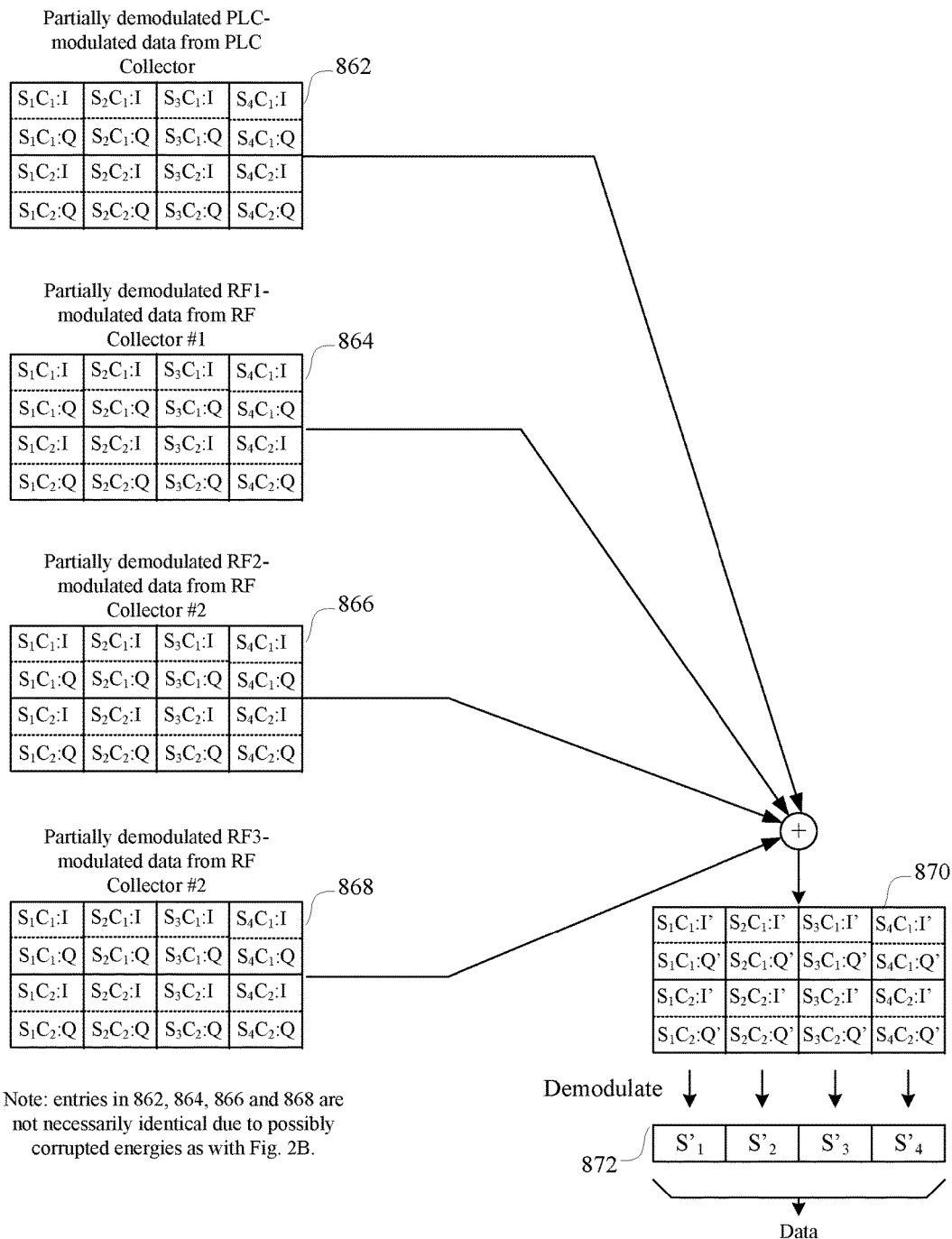
FIG. 8D illustrates an example combination of energy from partially demodulated data blocks provided to a data processing apparatus, in accordance with one or more embodiments.

FIG. 8D illustrates an example combination of energy from partially demodulated data blocks provided to the data processing apparatus 840. In this example, the data processing apparatus 840 receives a partially demodulated packet 862 generated by PLC collector 822 in response to receipt of the PLC1 data packet. The data processing apparatus 840 receives a partially demodulated packet 864 generated by RF collector 820 in response to receipt of the RF1 data packet. The data processing apparatus 840 also receives partially demodulated packets 866 and 868 generated by RF collector 824 in response to receipt of the RF2 and RF3 data packets.

The energy of I and Q components is individually combined for each symbol subcarrier of the data packets. For instance, I components (S1C1:I) corresponding to the first subcarrier (C1) of the first symbol (S1) are summed to form a respective combined value (S1C1:I'). As another example, Q components (S2C2:Q) corresponding to the second subcarrier (C2) of the second symbol (S2) are summed to form a respective combined value (S2C2:Q'). The combined values 870 are demodulated to produce data block 872 as described with reference to FIG. 2B.

Figure 9:
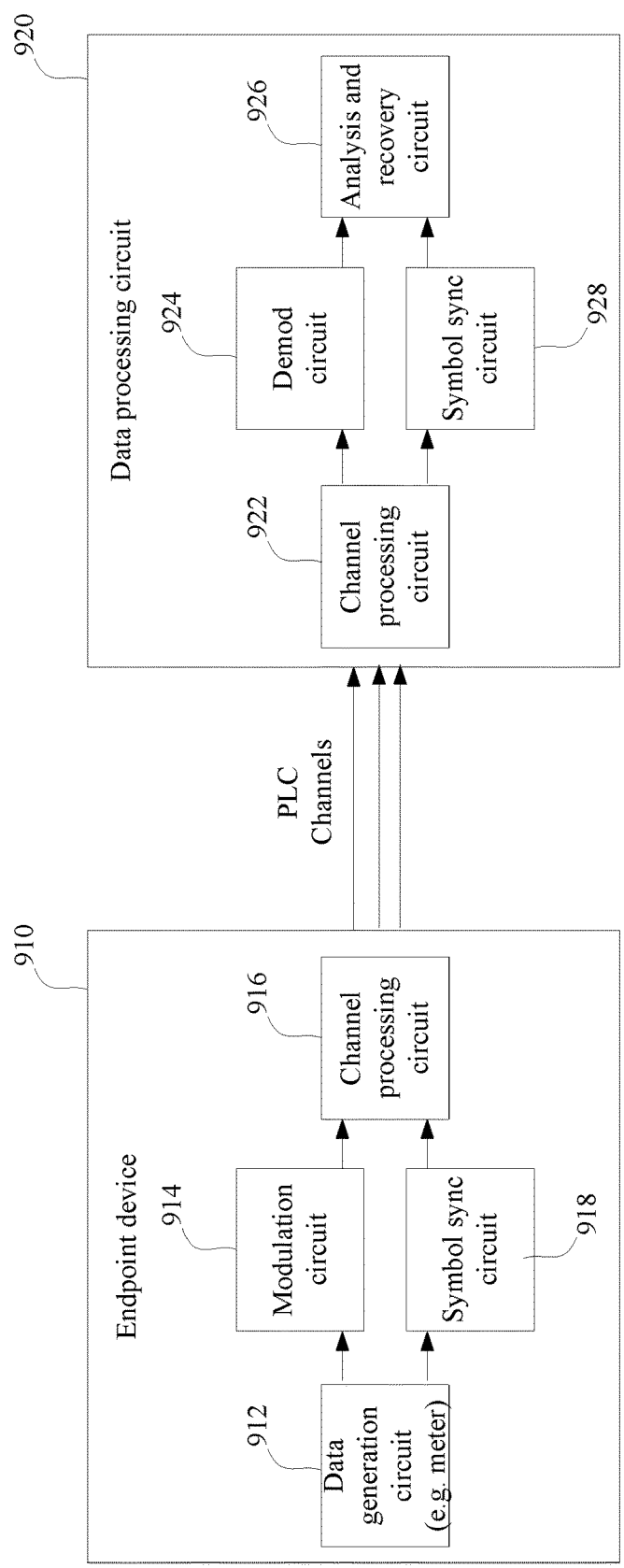
FIG. 9 is a block diagram of an example communication system, in accordance with one or more embodiments.

FIG. 9 is a block diagram of an example communication system, in accordance with one or more embodiments. A data processing circuit 920 (e.g., central command station in a PLC network) is communicatively connected to receive data symbols transmitted by an endpoint 910 over one or more communication channels of a wired connection. In this example, the endpoint includes data generation circuit 912 (e.g., a power meter) that generates data to be communicated. Symbols are modulated by modulation circuit 914 and temporally synchronized by symbol sync circuit 918. Modulated symbols are transmitted over the wire connected by channel processing circuit 916. A channel processing circuit 922 of the data processing circuit 920 is configured to receive the transmitted data symbols. Symbols are demodulated by demod circuit 924 and synchronized by symbol sync circuit 928. Analysis and recovery circuit 926 combines the energy of symbols received in error and determines a correct data value of the symbol from the combined energy, as described in FIGS. 1-8.

Figure 10:
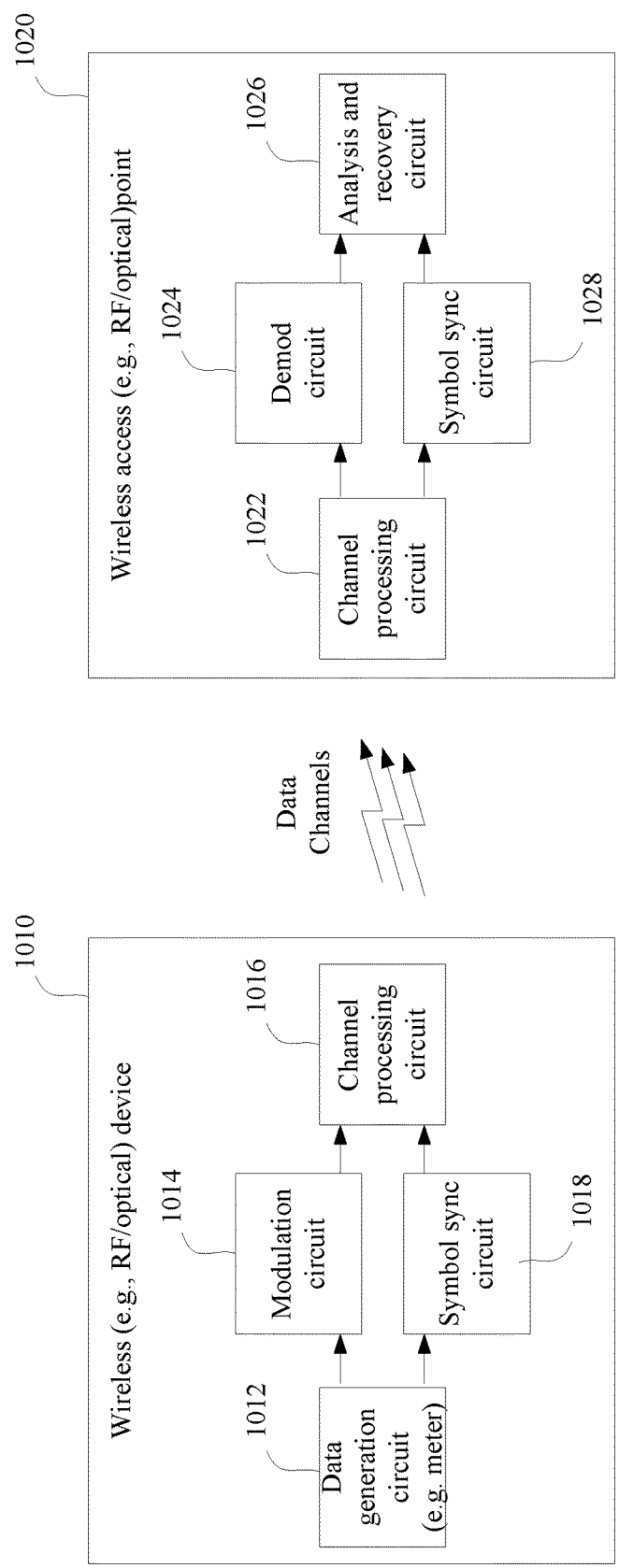
FIG. 10 is a block diagram of an example wireless communication system, in accordance with one or more embodiments.

Although data symbols in FIG. 9 are communicated over a wired connection, various embodiments may recover data values of symbols transmitted over wireless mediums. For example, FIG. 10 shows a block diagram of an example wireless communication system, in accordance with one or more embodiments. In this example, a wireless access point 1020 is communicatively connected to receive data symbols wirelessly transmitted by a wireless device 1010. In this example, the wireless device 1010 includes data generation circuit 1012 (e.g., a power meter) that generates data to be communicated. Symbols are modulated by modulation circuit 1014 and temporally synchronized by symbol sync circuit 1018. Modulated symbols are transmitted wirelessly by channel processing circuit 1016. A channel processing circuit 1022 of the wireless access point 1020 is configured to receive the transmitted data symbols. Symbols are demodulated by demod circuit 1024 and synchronized by symbol sync circuit 1028. Analysis and recovery circuit 1026 combines energy of symbols received in error and determines a correct data value of the symbol from the combined energy, as described in FIGS. 1-8.

According to other embodiments, aspects of the above-described PLC system are implemented and used in signal-modulation communication (SMC) in which data is encoded and shared wirelessly between a data processing apparatus that includes a data transmitter and data encoding circuitry, and a plurality of SMC endpoints. The plurality of SMC endpoints are situated at respective locations and configured to monitor SMC transmitted data designated for the respective locations. The data processing apparatus is situated remote from the respective locations and is configured and arranged to share the information, in the form of different ones of the data blocks respectively representing different aspects of the information, with the SMC endpoints. The SMC endpoints are circuit-based devices, such as appliances (e.g., tablets or handies such as smartphones, remote controls, household appliances, power-conservation data receivers, laptops, etc.). The SMC endpoints communicate wirelessly with the data processing apparatus which includes a data transmitter and data encoding circuitry for wirelessly sending the data blocks for reception, over a plurality of different communication channels, by the respective SMC endpoints. The plurality of SMC endpoints and one or more such data processing apparatus(es) are configured and arranged to: share the information by wirelessly transmitting one or more of the different data blocks over the different communication channel(s), wirelessly receive a first signal representing a transmitted one of the different data blocks over a first one of the plurality of different communication channels and wirelessly receive a second signal also representing the transmitted one of the different data blocks over a second one of the plurality of different communication channels, and discern information carried by the different data blocks. This information is discerned as a function of a signal versus noise measure associated with the first signal and the second signal by: aligning phases of the first and second signals, combining energy from the first and second signals as aligned, and converting the combined energy and therefrom providing output data representing said one of the different data blocks.

In more specific embodiments, such above-characterized systems are configured and arranged, respectively, such that SMC endpoints are communicatively coupled wirelessly with the data transmitter by one or more optical signal paths, and by at least one radio frequency (RF) signal path. In such systems where the SMC endpoints are communicatively coupled optically, the data transmitter includes a light-emitting diode (LED) circuit configured and arranged to generate pulses of light that encode information in the data block, and each SMC endpoint includes an optical receiver configured and arranged to receive and decode the encoded information. In such systems where the SMC endpoints are communicatively coupled by RF, the data transmitter includes an RF transmission circuit configured and arranged to generate modulated RF signals that encode information in the data block, and each SMC endpoint includes an RF receiver configured and arranged to receive and decode the encoded information.

The processes described herein can be implemented by various types of analog/digital electronic circuitry, or in computer software, firmware, or hardware, including the structures disclosed in this specification and their structural equivalents, or in combinations of one or more of them. For example, a data processing apparatus may be any of various different apparatus, devices, and machines for processing data including, by way of example, instructions executed on a processor, a computer, a system on a chip, or multiple ones, or various combinations of these. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

The processes and logic flows described in this specification can be performed by one or more programmable processors executing one or more computer programs to perform actions by operating on input data and generating output data. The processes and logic flows can also be performed by, and an apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices including, by way of example, semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on respective computers and having a client-server relationship to each other. In some embodiments, a server transmits data to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination with a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The various embodiments described above are provided by way of illustration only and should not be construed to limit the invention. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features of another figure even though the combination is not explicitly shown or explicitly described as a combination. It is intended that the specification and illustrated embodiments be considered as examples only, with a true scope of the invention being indicated by the following claims.

What is claimed is:

1. An apparatus for power line communication (PLC), the apparatus comprising:
    a substation circuit situated remote from respective facilities at which a plurality of PLC endpoints are configured, the substation circuit being configured and arranged to share information, in the form of different data blocks respectively representing different aspects of the information, with the plurality of PLC endpoints via power lines which are power-coupled to the plurality of PLC endpoints;
    the substation circuit being configured and arranged to:
        share the information with the plurality of PLC endpoints by transmitting, over the power lines, one of the different data blocks over a plurality of different communication channels;
        over the power lines, receive a first signal representing a transmitted one of the different data blocks over a first one of the plurality of different communication channels and receive a second signal also representing the transmitted one of the different data blocks over a second one of the plurality of different communication channels, wherein at least one endpoint of the plurality of PLC endpoints is configured and arranged to: in a first mode, transmit the one of the different data blocks to at least one data processing apparatus by transmitting a single data block over a single one of the plurality of different communication channels, and in a second mode, transmit the one of the different data blocks to the at least one data processing apparatus by transmitting the one of the different data blocks over at least the first and second ones of the plurality of different communication channels; and
        discern information carried by said one of the different data blocks, as a function of signal and noise indications associated with the first signal and the second signal by combining energy from the first and second signals and converting the combined energy to output data representing said one of the different data blocks.

2. The apparatus of claim 1, wherein the one of the different data blocks is concurrently transmitted on multiple ones of the different communication channels, the first and second signals include errors, and the output data is error free, and wherein the first one of the plurality of different communication channels uses a first frequency for transmission of the one of the different data blocks; and
    the second one of the plurality of different communication channels uses a second frequency, for transmission of the one of the different data blocks, that is different from the first frequency.

3. The apparatus of claim 1, further comprising a plurality of receivers configured and arranged to be spatially separated from one another and with at least one of the receivers configured to receive the first signal via the first one of the plurality of different communication channels and another of the receivers configured to receive the second signal via the second one of the plurality of different communication channels.

4. The apparatus of claim 1, further comprising a plurality of receivers configured and arranged to be spatially separated from one another and with at least one of the receivers configured to receive the first signal via the first one of the plurality of different communication channels and another of the receivers configured to receive the second signal via the second one of the plurality of different communication channels, wherein the first and second ones of the plurality of different communication channels use the same frequency for transmission of the one of the different data blocks.

5. The apparatus of claim 1, wherein at least one of the plurality of PLC endpoints includes:
    a first transmitter configured and arranged to transmit the one of the different data blocks via the first one of the plurality of different communication channels; and
    a second transmitter configured and arranged to transmit the one of the different data blocks via the second one of the plurality of different communication channels, wherein the second transmitter is spatially discernible from the first transmitter by the at least one data processing apparatus for clarity.

6. The apparatus of claim 5, wherein the first and second ones of the plurality of different communication channels use the same frequency for transmission of the one of the different data blocks.

7. The apparatus of claim 1, wherein the at least one endpoint of the plurality of PLC endpoints is further configured and arranged to,
- operate in the first mode in response to a signal to noise ratio, associated with the at least one endpoint, being greater than a threshold value; and
- operate in the second mode in response to the signal to noise ratio being less than the threshold value.

8. The apparatus of claim 1, wherein at least one of the different data blocks includes a plurality of data symbols, each data symbol having an in-phase component and a quadrature-phase component.

9. The apparatus of claim 1, wherein at least one of the different data blocks includes a plurality of data symbols, each data symbol having an in-phase component and a quadrature-phase component, and further comprising the at least one data processing apparatus for clarity that is configured to separately combine energy of in-phase components of the plurality of data symbols and separately combine energy of quadrature-phase components of the plurality of data symbols.

10. A method implemented by a substation circuit of a power line communication (PLC) system in which the substation circuit is situated remote from respective facilities at which a plurality of PLC endpoints are configured, the substation circuit being configured and arranged to share information, in the form of different data blocks respectively representing different aspects of the information, with the plurality of PLC endpoints via power lines which are power-coupled to the plurality of PLC endpoints, the method comprising:
- sharing the information with the plurality of PLC endpoints by transmitting, over the power lines, one of the different data blocks over a plurality of different communication channels;
- over the power lines, receiving a first signal representing a transmitted one of the different data blocks over a first one of the plurality of different communication channels and receiving a second signal also representing the transmitted one of the different data blocks over a second one of the plurality of different communication channels, wherein at least one endpoint of the plurality of PLC endpoints is configured and arranged to: in a first mode, transmit the one of the different data blocks to at least one data processing apparatus by transmitting a single data block over a single one of the plurality of different communication channels, and in a second mode, transmit the one of the different data blocks to the at least one data processing apparatus by transmitting the one of the different data blocks over at least the first and second ones of the plurality of different communication channels; and
- discerning information carried by said one of the different data blocks, as a function of signal and noise indications associated with the first signal and the second signal by combining energy from the first and second signals and converting the combined energy to output data representing said one of the different data blocks.

11. The method of claim 10, wherein the step of discerning information includes aligning phases of the first and second signals.

12. The method of claim 10, wherein the step of discerning information includes combining energy from the first and second signals with phases of the first and second signals being aligned.

13. The method of claim 10, wherein the step of discerning information includes combining energy from the first and second signals with phases of the first and second signals being aligned, and converting the combined energy and therefrom providing the output data representing said one of the different data blocks.

14. The method of claim 10, wherein the first and second signals include errors, and the output data is error free.

* * * * *